June 6, 1950 K. A. KAIL 2,510,580
NORTHERLY TURNING ERROR COMPASS SIMULATING
MEANS FOR GROUNDED AVIATION TRAINERS Filed Aug. 24, 1946 3 Sheets-Sheet 1

FIG. 1

KARL A. KAIL
*INVENTOR.*

BY Donald V. Hillier

*ATTORNEY*

KARL A. KAIL
INVENTOR

BY Ronald T. Hilier
ATTORNEY

June 6, 1950

K. A. KAIL 2,510,580

NORTHERLY TURNING ERROR COMPASS SIMULATING
MEANS FOR GROUNDED AVIATION TRAINERS

Filed Aug. 24, 1946

KARL A. KAIL
*INVENTOR.*

BY Donald T. Hillier

*ATTORNEY*

Patented June 6, 1950

2,510,580

UNITED STATES PATENT OFFICE 2,510,580

NORTHERLY TURNING ERROR COMPASS SIMULATING MEANS FOR GROUNDED AVIATION TRAINERS

Karl A. Kail, Montrose, Pa., assignor to Link Aviation, Inc., Binghamton, N. Y., a corporation of New York Application August 24, 1946, Serial No. 692,744

10 Claims. (Cl. 35—10.2)

This invention relates to improved means for use in grounded aviation trainers for simulating the functioning of a real magnetic compass in a plane in actual flight, and more particularly relates to means for simulating what is commonly referred to as "northerly turning error."

It is well known to those skilled in the art of flying aircraft that if a plane is at any heading south of east or west, when the plane is turning in either direction the compass indication precedes the actual plane's heading. On the other hand, if the heading of the plane is north of east or west, when the plane is turning in either direction the compass indication lags behind the actual plane's heading. In both cases, the lead or lag, as the case may be, is at a maximum when the plane is heading due north or south, and in both cases as the heading of the plane is due east or west the compass indication, discounting variation and deviation with which this application is not concerned, is also substantially east and west, respectively.

For example, in the case of a plane in actual flight north of the equator when the plane is on a west heading and it is turning toward the east through north, the compass deflects in a westerly direction by a certain amount, e. g., 30 degrees, soon after the start of the turn, and as the turn continues toward the east, the compass indication continues to lag actual plane heading until about 30 degrees north of east, at which time the compass indication accelerates towards an easterly indication so that the compass indicates an easterly heading at about the same time that the plane reaches the actual east heading. As the actual heading of the plane passes south of east, the compass indication precedes the plane's heading by a certain number of degrees soon after the east heading is passed, and maintains this lead until the actual plane heading is about 30 degrees south of west, at which time the compass indication changes slower than actual heading changes, so that when the plane reaches a west heading the compass also indicates flight toward the west, again discounting variation and deviation.

On the other hand, if the plane is on a west heading and turns towards east through south, the compass indication will precede the plane heading soon after the west heading is passed, maintain the lead until about 30 degrees south of east, at which time the indicated change will be slower than the actual change so that the compass indication and the actual heading agree when the plane reaches an easterly heading, and as the plane turns from east toward west through north, the compass heading will lag the actual heading in a corresponding pattern until actual heading and compass indication agree when the plane reaches a westerly heading.

The magnitude of the lead or lag (northerly turning error), depends on the rate of turn—the faster the rate of turn the greater will be the magnitude of the northerly turning error. It also depends on the type and sensitivity of the compass and the distance of the plane from the equator.

Also, when the plane is taken out of a turn the compass indication is leading or lagging the actual plane heading except on an east or west heading, and as a result the compass oscillates in diminishing cycles five or six times until it comes to rest on or about the actual plane heading, discounting again variation and deviation.

It is a principal object of this invention to provide means for use in a grounded aviation trainer whereby the indications of a simulated magnetic compass indicating instrument in the trainer are properly modified to simulate northerly turning error as well as the compass oscillations which occur when the plane heading is terminated at any heading other than east or west.

In order that the detailed nature of this invention may be clearly understood by those skilled in the art, reference is made to the accompanying drawings wherein the preferred embodiment of my invention is disclosed. In the drawings.

Figure 1:
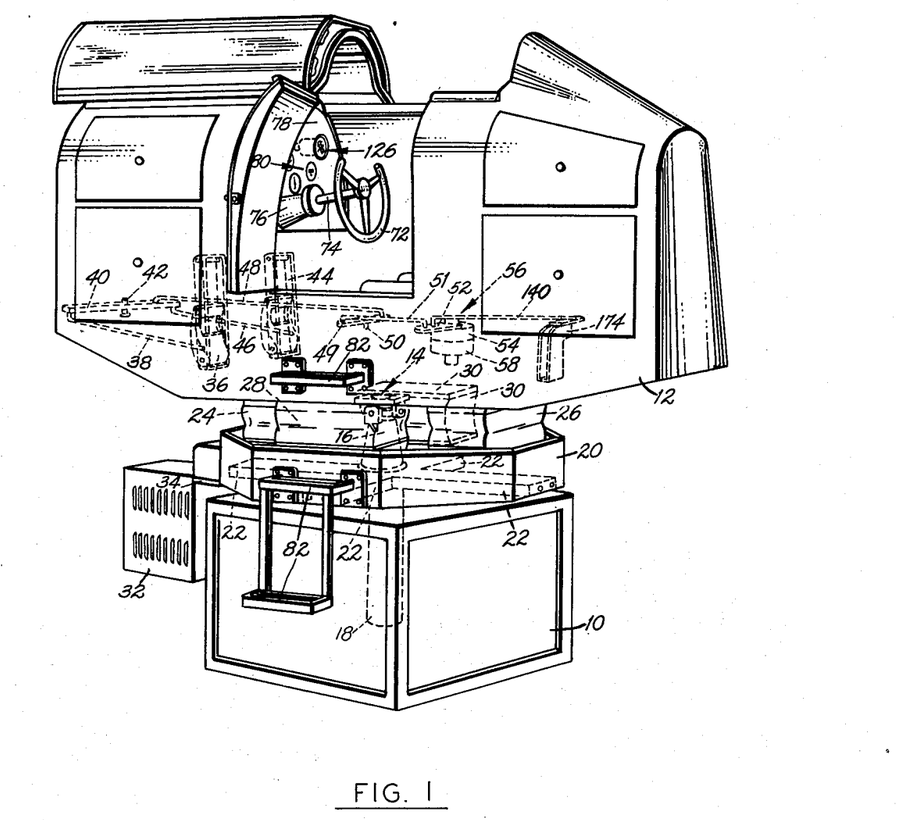
Fig. 1 is a general exterior perspective view of one well known type of grounded aviation trainer and in conjunction with which this invention is especially useful.
Figure 2:
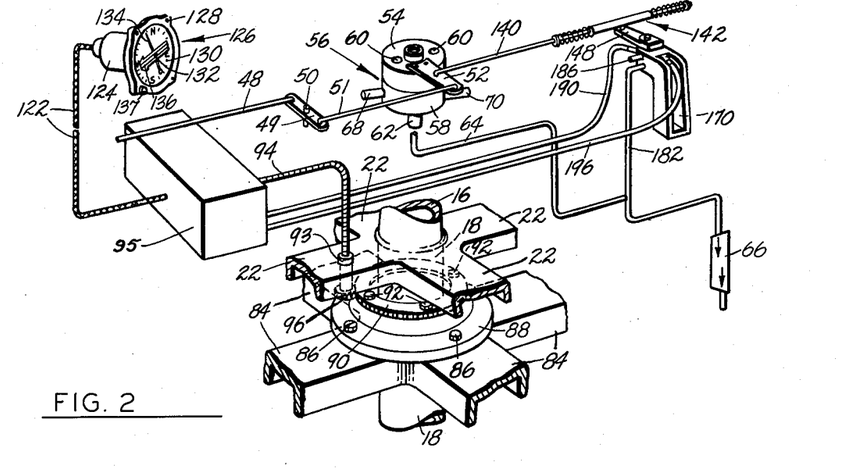
Fig. 2 is a general perspective view showing the general arrangement of the principal parts of this invention.

Referring now to Fig. 1, it will be seen that the stationary base of the trainer is designated 10 and the fuselage 12. The floor of the fuselage rests upon the top of the universal joint designated generally by 14, this joint being in turn supported by the pedestal 16 which rests upon the main spindles 18. The conventional octagon is designated by 20, and a plurality of cross arms 22 are affixed to the bottom of pedestal 16 as well as to the octagon 20. The forward pitching bellows 24, the rearward pitching bellows 26, the left banking bellows 28 and the right banking bellows 30 are all shown in Fig. 1. The turning motor is designated 32, and the arms supporting this motor by 34. The left rudder pedal 36 is connected through link 38 to the left end of the rudder bar 40 which is pivoted at 42, and the right rudder pedal 44 is connected through link 46 to the opposite end of rudder bar 40. Link 48 in turn connects the right end of rudder bar 40 with the reversing lever 49, pivoted at 50, and link 51 connects the other end of lever 49 with the outer end of the arm 52 which is affixed to the upper leaf 54 of the rudder valve designated generally by 56. The lower leaf of the rudder valve is designated 58. In Fig. 2 the upper leaf 54 of the rudder valve is provided with a pair of atmosphere ports 60 and the central stem 62 of this valve is connected through pneumatic line 64 to a suitable source of vacuum 66. The fixed lower leaf 58 in turn is connected through the pneumatic lines 68 and 70 with the turning motor 32. As is well known to those skilled in the art, upon a pressing forward of the left rudder pedal 36 the link 48 moves to the rear, through the action of reversing lever 49 link 51 moves ahead, rotating the upper leaf 54 of the rudder valve 56 clockwise as seen from above. Vacuum and air pressure are selectively admitted through the pneumatic lines 68 and 70 to the turning motor 32, which motor is energized to rotate the main spindle 18, octagon 20, cross arms 22, pedestal 16, universal joint 14, fuselage 12 and bellows 24, 26, 28 and 30 to the left, or counterclockwise as seen from above. This rotation will continue as long as the left rudder pedal 36 is pressed ahead of its neutral position, and the rate of such turning will depend upon the magnitude of forward displacement of the rudder pedal 36 from its neutral position. Upon a return of the rudder pedal 36 to its neutral position, the rotation of fuselage 12 and of the other mentioned elements ceases.

On the other hand, when the right rudder pedal 44 is pressed ahead of its neutral position the right end of rudder valve 40 moves ahead, causing link 48 to move in the same direction and link 51 to move to the rear, resulting in a counterclockwise rotation of the upper leaf 54 of the rudder valve 56. In this instance, vacuum and atmosphere are admitted to the turning motor 32 through the lines 68 and 70 in a reversed manner, and motor 32 is energized to rotate all of the mentioned parts to the right, or clockwise as seen from above. The rotation continues as long as the right rudder pedal 44 is pressed ahead of its neutral position, and the rotation is at a rate dependent upon the magnitude of the displacement of the right rudder pedal from its neutral position.

It will be noted that upon a pressing forward of the left rudder pedal 36 the right rudder pedal 44 moves to the rear, and vice versa, just as in the case of a real plane.

The conventional control wheel is designated 72, and this wheel is held by the shaft 74 which is slidably and rotatably mounted within the pedestal 76 positioned to the rear of the instrument panel 78 upon which are mounted a plurality of instruments 80. Also, as is well known to those skilled in the art, forward movement of the wheel 72 results in a collapsing of the bellows 24 and in an expansion of bellows 26, and the front end of fuselage 12 is lowered. Opposite movement of wheel 72 results in an opposite functioning of the bellows 24 and 26, and the nose of fuselage 12 is raised. A counterclockwise rotation of wheel 72 results in a collapsing of bellows 28 and in an expansion of bellows 32, and the fuselage 12 banks toward the left. Opposite movement of wheel 72 results in a contraction of bellows 30 and in an expansion of bellows 28, and the fuselage 12 banks toward the right.

A plurality of steps 82 are provided in order that access to the cockpit of fuselage 12 may be easily had. A suitable seat (not shown) is provided within fuselage 12 to the rear of wheel 72, which seat is occupied by the student in the trainer. The instruments upon the instrument panel correspond to the flight instruments of a plane in actual flight, and these instruments are designed to properly respond to all fuselage movements as well as to movements of the simulated engine controls (not shown) in a manner to simulate the functioning of the instruments of a real plane in response to corresponding plane and engine control movements.

For a detailed disclosure of all the previously described elements reference is made to U. S. Patents 1,825,462 and 2,099,857 issued to Edwin A. Link.

Reference is now made to Fig. 2 where the spindle 18 which is rotatably mounted within base 10 is shown. Four cross members 84 which are affixed to the base 10 are provided, and affixed to these cross members by means of bolts 86 is the casting 88. Upon the top of this casting is the ring gear 90 which is affixed to the casting by means of bolts 92. Accordingly, the ring gear 90 is stationary at all times. The cross arms 22 which are affixed to the octagon 20 are shown in Fig. 2, and in one of these cross arms is placed a sleeve 93 through which passes the flexible cable sheathing 94. Upon the lower end of the flexible cable contained within the sheathing 94 is affixed the pinion gear 96 which meshes with the ring gear 90. It will be appreciated that as the fuselage 12 rotates with respect to the stationary base and the ring gear 90, the gear 96 travels around the ring gear 90 and rotates the flexible cable contained within the sheathing 94. The direction of rotation of the flexible cable will, of course, be dependent upon the direction of rotation of fuselage 12, and the angular rotation of the flexible cable will be dependent upon the angular rotation of uselage 12. Sheathing 94 and the cable therewithin lead to the unit 95 shown in box form in Fig. 2. The construction of this unit is shown in Fig. 3.

Figure 3:
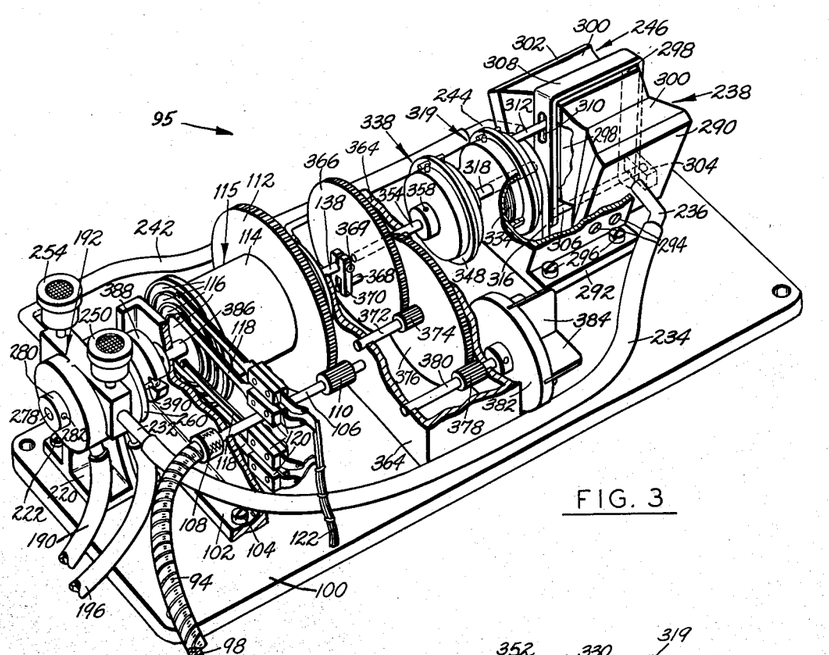
Fig. 3 is a general exterior view of the main unit of my invention.

Referring now to Fig. 3, the flexible sheathing 94 is shown, as is the previously mentioned flexible cable 98 contained therewithin, which cable is rotated in response to rotations of the previously mentioned pinion 96. The unit 95 in Fig. 3 includes a base 100 upon which is affixed the bracket 102 by means of screws 104. The bracket 102 rotatably supports the shaft 106 which is connected to the flexible cable 98 through the coupling 108 so that the shaft 106 is rotated in response to rotations of the flexible cable 98. Upon the right end of shaft 106 is affixed the pinion 110 which is meshed with the gear 112 in order to drive the same. Gear 112 in turn is affixed upon the housing 114 of a Selsyn type transmitter designated generally by 115, which transmitters are well known to those skilled in the art. Upon the opposite end of housing 114 from gear 112 are affixed a plurality of mutually insulated slip rings 116 which are electrically connected to the rotor and stator coils within housing 114 in a manner which is well known to those skilled in the art. A brush 118 is provided for each of the slip rings 116, and the outer ends of the brushes are supported by the insulating blocks 120 which in turn may be suitably supported by bracket 102 mounted upon the base 100. Each of the brushes 118 is connected to an electrical conductor contained in the cable 122. The cable 122, as shown in Fig. 2, has its other end connected to the Selsyn receiver 124 affixed to the rear of the magnetic compass indicator designated generally by 126. As shown in Fig. 1, this indicator is mounted upon the instrument panel 78 to be visible to the student within fuselage 12 at all times.

The magnetic compass indicator 126 includes a casing 128 which is attached to the instrument panel 78 and a dial 130 graduated "N," "E," "S," and "W." Also, dial 130 may be suitably graduated intermediate the cardinal points, just as in the case of a real aircraft compass. The Selsyn receiver 124 includes a conventional output shaft 132 upon which is affixed the needle 134 so that the needle moves over the dial 130. The instrument is also provided with a reference pointer 136 which may be set by means of knob 137 to the indication to be flown, just as in the case of a similar instrument in a real plane.

Referring back to Fig. 3, the rotor of the Selsyn transmitter whose housing is designated 114 is designated 138. Means for actuating this rotor will be later fully described.

The Selsyn type transmitter 115 and Selsyn type receiver 124 which are electrically connected by cable 122 are of the type that whenever the rotor 138 of the transmitter moves through a certain number of degrees, the output rotor 132 of receiver 124 has a simultaneous angular movement of the same magnitude imparted thereto. The electrical connection may be made so that upon a rotation of the input rotor 138 of the transmitter in one direction the output shaft 132 of the receiver rotates in a selected direction, while reversal of direction of the rotation of the input shaft results in a reversal of direction of the movement of the output shaft. Inasmuch as the output shaft of the receiver is always positioned relative to its housing in accordance with the instant position of the rotor of the transmitter relative to its housing, it will be appreciated that if the input shaft of the transmitter remains stationary, a rotation of the housing of the transmitter will also produce a movement of the output shaft of the receiver through the same angle as the housing of the transmitter is rotated. Such a rotation of the housing of the transmitter rotates the output shaft of the receiver in a direction opposite the direction of movement that the output shaft would rotate if the input shaft of the transmitter were rotated in the same direction as the housing of the transmitter.

In view of the nature of the Selsyn transmitting system and the arrangement of the previously described parts of this invention, it will be appreciated that as the fuselage 12 turns with respect to the stationary base 10, the pinion 96 is rotated and turns the flexible cable 98 which in turn rotates shaft 106 carrying pinion 110. The gear 112 is rotated as is the housing 114 of the Selsyn transmitter, and through slip rings 116, brushes 118 and cable 122 the output shaft 132 of the receiver 124 is rotated, moving the compass indicating needle 134 over the face of the dial 130. Accordingly, as the fuselage 12 rotates clockwise as seen from above through a given number of degrees, corresponding to the turning of a real plane to the right, the housing 114 rotates counterclockwise as seen from the right in Fig. 3, and needle 134 will move clockwise over the dial 130. On the other hand, an opposite rotation of fuselage 12 will result in an opposite rotation of housing 114 and in an opposite movement of needle 134 over the dial 130. It will be appreciated that the apparatus may be designed so that the needle 134 moves over the dial 130 degree for degree of rotation of the fuselage 12.

Accordingly, as the assumed heading of fuselage 12 changes, the magnetic compass indicator 126 properly indicates the change in assumed heading.

Considering now the means of this invention for simulating northerly turning error, reference is made to Fig. 2 where it will be seen that the forward end of link 140 is connected to the arm 52 which is affixed upon the upper section 54 of the rudder valve 56. Upon the rear end of this link is a conventional compensating assembly designated generally by 142. In order that the detailed nature of the compensating assembly 142 may be better understood, reference is made to Fig. 4 where it will be seen that this assembly includes an outer sleeve 144 which is connected to the outer end of arm 148 by means of stud 146. Within sleeve 144 is a second sleeve 150. A washer 152 abuts against the forward end of each of the sleeves 144 and 150, and the rear end of spring 154 in turn engages this washer. A second washer 156 engages the forward end of spring 154, and a cotter pin 158 limits the forward movement of washer 156. A corresponding washer 152a, spring 154a, washer 156a and cotter pin 158a are provided on the opposite side of the sleeves 144 and 150.

Figures 4, 5, 5A:
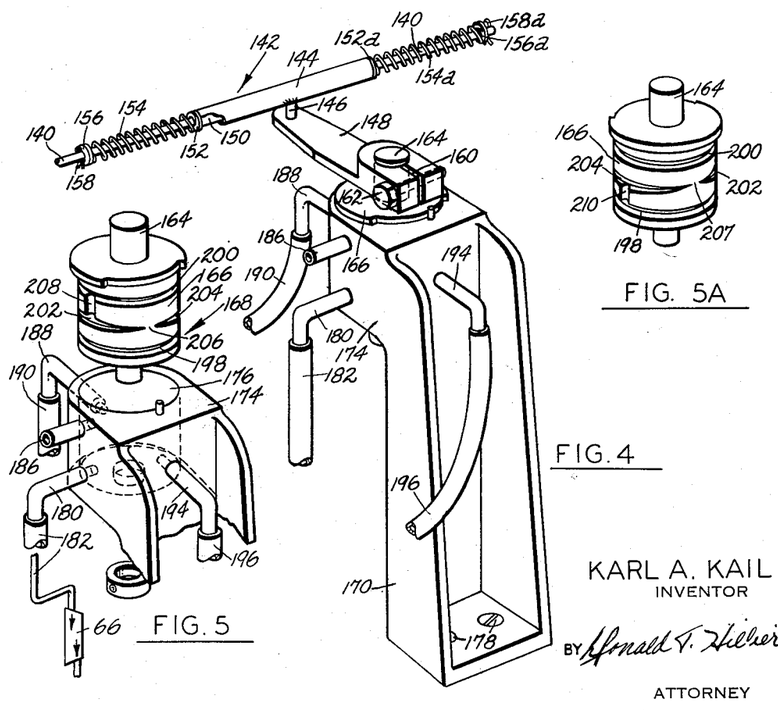
Fig. 4 is a general exterior view of the reversible valve assembly.
Fig. 5 is an exploded perspective view of the detailed construction of the reversible valve.
Fig. 5A is a perspective view of the opposite side of the reversible valve rotor from the side shown in Fig. 5.

The inner end of arm 148 is enlarged and slotted at 160 as shown, and a bolt 162 is provided to securely fasten said end upon the arbor 164 of the rotor 166 of the reversible valve designated generally by 168, which valve is shown in detail in Fig. 5, to which reference is made.

It will be seen that the reversible valve 168 includes an integral bracket 170 and stationary housing 174 in which is a circular chamber 176. Bracket 170 may be suitably affixed to the floor of fuselage 12 by means of screws 178. Four connections are provided to the chamber 176 in the housing 174. The first of these connections includes the coupling 180 which is connected through the pneumatic line 182 to the vacuum source 66; the second includes the coupling 186 which merely vents chamber 176 to the atmosphere; the third includes the coupling 188 which is connected through the pneumatic line 190 with the heading valve designated generally by 192 in Fig. 3; and the fourth includes the coupling 194 which is connected through the pneumatic line 196 with the heading valve 192.

The rotor 166 of the reversible valve 168 is of a diameter slightly less than the diameter of chamber 176 so that it will fit therewithin in a substantially airtight manner. A groove 198 completely encircles the rotor 166 near the bottom thereof, and a second groove 200 also completely encircles rotor 166 near the top thereof. A pair of tapered grooves 202 and 204 are placed in rotor 166 intermediate the grooves 198 and 200, and each of the grooves 202 and 204 extends around rotor 166 for a distance somewhat less than 180 degrees so that there are two areas 206 and 207 between the adjacent ends of the grooves 202 and 204, referring also to Fig. 5A. A channel 208 connects the groove 200 with the tapered groove 202, and a similar channel 210 connects the groove 204 with groove 198.

When the rotor 166 is placed within the chamber 176 of housing 174, the lower groove 198 lies opposite the interior opening of coupling 180, and therefore vacuum is present at all times in groove 198, channel 210 and the tapered groove 204. At the same time, the groove 200 is in communication with the port 186 which leads to the atmosphere, and accordingly atmospheric pressure is present at all times in groove 200, channel 208 and the tapered groove 202.

When the rudder pedals 36 and 44 are in their neutral positions, the upper leaf 54 of the rudder valve 56 will be neutralized, and the turning motor 32 will be inoperative. At the same time, the link 140 will be neutralized as will the rotor 166 of the reversible valve 168. In this position the area 206 between one pair of the adjacent ends of the tapered grooves 202 and 204 will be opposite the opening into chamber 176 connected to coupling 194, and neither atmosphere nor vacuum will be transmitted through the pneumatic line 196 to the heading valve 192 of Fig. 3. Under the same conditions, the area 207 of the rotor 166 will be opposite the opening into chamber 176 which connects with coupling 188, and neither vacuum nor atmosphere will be transmitted through the pneumatic line 190 to the heading valve 192. Inasmuch as the fuselage 12 is not turning whenever the rudder valve and the reversible valve 168 are neutralized, it will be appreciated that the indications given by the magnetic compass indicator 126 will remain constant.

However, assuming that the left rudder pedal 36 is pressed ahead of its neutral position, the right end of rudder bar 40 moves to the rear as does the link 48, link 51 moves ahead as does link 146, and the arm 148 is rotated counterclockwise as seen from above in Figs. 2 and 4. Referring to Fig. 5, it will be appreciated that the rotor 166 will be moved in the same direction, and the atmosphere groove 202 will register with the coupling 194 so that atmosphere is admitted through the pneumatic line 196 to the heading valve 192 of Figs. 3 and 6. At the same time, the vacuum groove 204 will come into engagement with the coupling 188 and vacuum will be admitted along pneumatic line 190 to the heading valve 192.

On the other hand, should the right rudder pedal 44 be pressed ahead of its neutral position, it will be appreciated that the rotor 166 of the reversible valve 168 will be rotated clockwise as seen from above from its neutral position, the vacuum groove 204 will come into communication with coupling 194 and vacuum will be admitted to the heading valve 192 through pneumatic line 196. At the same time the atmosphere groove 202 will register with the coupling 188, and atmosphere will be transmitted along pneumatic line 190 to the heading valve 192.

It will also be appreciated that the magnitude of atmosphere and vacuum admitted to the lines 190 and 196 through valve 168 depends upon the magnitude of displacement of the rudder pedals from their neutral positions, and accordingly is proportional to the rate of turn of fuselage 12.

Figure 6:
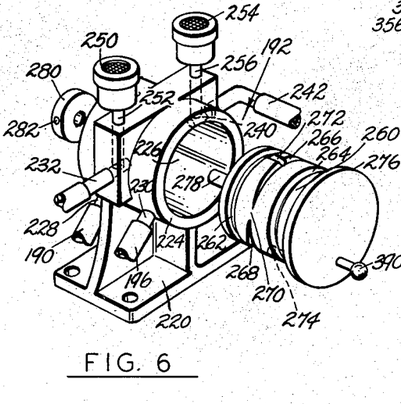
Fig. 6 is an exploded perspective view of the detailed construction of the heading valve.

Reference is now made to Figs. 3 and 6 which disclose the general position and detailed construction of the rotary heading valve designated generally by 192. It will be seen that a bracket 220 is affixed to the base 100 by means of screws 222; and that the stationary housing 224 of the heading valve 192 is integral with bracket 220.

The housing 224 includes a chamber 226 which has four hollow couplings communicating therewith. The first of these couplings is designated 228 and is connected to the previously described pneumatic line 190; the second coupling is 230 and is connected to the previously described pneumatic line 196; the third is the coupling 232 which connects with the pneumatic line 234 which, as seen in Fig. 3, connects to the coupling 236 which communicates with the interior of the bellows designated generally by 238; and the fourth is the coupling 240 which connects through the pneumatic line 242 with the coupling 244 which communicates with the interior of the bellows designated generally by 246. A filter 250 is connected through coupling 252 with the coupling 232, and a second filter 254 is connected through coupling 256 with the coupling 240. Both of the filters 250 and 254 communicate with the atmosphere, and accordingly, a slight atmospheric vent is always provided for reasons to be explained.

The rotor of the heading valve is designated 260, and its construction is substantially identical with that of the rotor 166 of the reversible valve 168. Consequently, rotor 260 includes a pair of grooves 262 and 264 which completely encircle the rotor, as well as a pair of tapered grooves 266 and 268 which lie intermediate the grooves 262 and 264. The ends of the tapered grooves 266 and 268 are offset from one another at the two points diametrically opposite points 270 (only one shown), just as in the case of the reversible valve shown in Fig. 5. A channel 272 connects the groove 262 with the tapered groove 266, while channel 274 connects groove 264 with the tapered groove 268.

The diameter of the rotor 260 is slightly less than the diameter of the chamber 226 so that it may fit therewithin in a substantially airtight fashion, and the outer end of rotor 260 carries a flange 276 which engages the lip of housing 224. Also, the arbor 278 is integral with rotor 260, and a collar 280 may be affixed upon the outer end of arbor 278 by means of set screw 282 in order to retain the rotor 260 in longitudinal position.

The functioning of the heading valve will be later described herein in detail.

Figure 7:
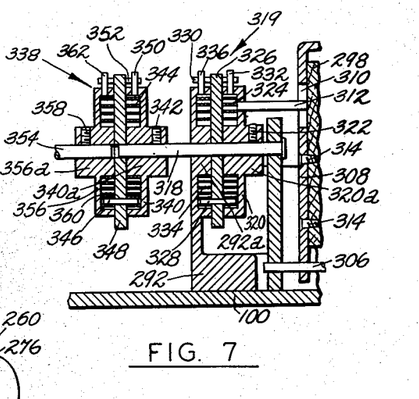
Fig. 7 is a cross-sectional view through the bellows centering and compass oscillating spring coupling assemblies which are shown in perspective form in Fig. 3.

Referring now to Fig. 3, it will be seen that the bellows 238 includes a stationary member 290 affixed to the bracket 292 by means of screws 294, bracket 292 in turn being affixed to the base 100 by means of screws 296. The movable portion of bellows 238 is designated 298, and a suitable airtight fabric 300 renders bellows 238 airtight. The bellows 246 includes a stationary member 302, supported like the member 290, and the member 298 forms the other side of bellows 246. Fabric 300 also renders bellows 246 airtight. A block 304 is affixed upon the base 100, and this block supports one end of the rod 306 upon which is pivotally mounted the lower ends of the U-shaped member 308 which encircles the upper three sides of the common bellows-forming member 298. The other end of rod 306 is supported by bracket 292 as best seen in Fig. 7. A slot 310 is placed in member 308, and the outer end of rod 312 passes through this slot to engage the U-shaped member 308. As best seen in Fig. 7, the U-shaped member 308 is affixed to the common bellows-forming member 298 by means of screws 314.

Referring still to Fig. 7, it will be seen that the casting 292 supports the shaft 318 upon which the spring housing 320 is affixed by means of set screw 322. Spring housing 320 houses the flat torsion spring 324, the inner end of which is affixed to the hub 320a of housing 320 and the outer end of which is anchored upon the pin 328 which passes through disc 326 as shown. A second pin 330 also passes through disc 326 and is positioned to be engaged by the pin 332 which is carried by housing 320, as shown. The casting 292 also houses the spring 334, the outer end of which is anchored upon pin 328 and the inner end of which is affixed to the hub 292a of housing 292. Spring 334 is identical in construction with spring 324, but it is wound in the opposite direction. A pin 336 is carried by casting 292 to engage the previously mentioned pin 330, under circumstances to be described.

To the left of the just described spring assembly, which for convenience is designated generally by 319 and is hereinafter referred to as the bellows centering assembly, is a spring coupling assembly designated generally by 338 and which includes a spring housing 340 affixed upon shaft 318 by means of set screw 342. Housing 340 houses the spring 344, the outer end of which is anchored upon pin 346 which passes through disc 348, and the inner end of which is affixed to the hub 340a of housing 340. A pin 350 is carried by housing 340 and engages the pin 352, which is also carried by disc 348, under circumstances to be later described. A second shaft 354 is aligned with the shaft 358, and upon this shaft is affixed the spring housing 356 by means of set screw 358. This housing contains the spring 360, the outer end of which is affixed upon the pin 346 and the inner end of which is affixed to the hub 356a of housing 356. A pin 362 is carried by housing 356 to engage the previously described pin 352 under circumstances to be later described. The springs 344 and 360 are identical in construction, but are wound in opposite directions for reasons later made apparent.

Referring to Fig. 3, it will be seen that the shaft 354 is rotatably mounted in the bracket 364 which may be suitably affixed to the base 100. Upon the left end of shaft 354 there is mounted the spur gear 366 which carries the eccentric pin 368 which engages the yoke 370 which in turn is affixed by means of screw 369 upon the rotor 138 of the Selsyn transmitter 115.

Also in Fig. 3, it will be seen that the bracket 364 carries the shaft 372 upon the outer end of which is affixed the pinion 374 which is driven by gear 366. Pinion 374 is integral with the spur gear 376 which in turn drives the pinion 378 affixed upon shaft 380 which is rotatably carried by bracket 364. Upon the outer end of shaft 380 is affixed the flywheel 382 which carries a plurality of air engaging blades 384 which damp the action of the flywheel 382.

As also seen in Fig. 3, affixed to the stator 114 of the Selsyn type transmitter 115 is the shaft 386 upon the left end of which is integrally mounted the coupling member 388 which engages the pin 390 carried by the right end of the rotor 260 of the heading valve.

Considering now the operation of the spring coupling assemblies shown in Figs. 3 and 7, it will be appreciated that whenever bellows 246 is collapsed and bellows 238 expanded, as will be later explained in detail, the U-shaped member 308 carried by the central bellows member 298 will rotate clockwise as seen from the right in Figs. 3 and 7. Such a movement carries the rod 312 in the same direction and the housing 320 is similarly rotated. The pin 332 engages pin 330 and accordingly disc 326 is rotated with the housing 320. The spring 324 within housing 320 is also rotated in the same direction, and inasmuch as spring 324 is anchored to disc 326 and to housing 320, this spring will neither be tensioned or relaxed. However, the spring 334 which has its inner end anchored to the stationary housing 292 and its outer end to the pin 326 will be tightened, and will exert a force upon the disc 326 tending to rotate this disc, the housing 320 and spring 324 back to their neutral positions. However, as long as bellows 246 remains collapsed and bellows 238 remains expanded, the spring 334 will not have sufficient strength to return the just described parts to their neutral positions. Inasmuch as housing 320 is pinned upon shaft 318 by means of pin 322, the shaft 318 will be rotated clockwise as seen from the right, and inasmuch as housing 340 is pinned to shaft 318 by pin 342, the spring housing 340 will be rotated in the same direction. Pin 350 engages pin 352 and rotates the disc 348 with housing 340, and, of course, spring 344 rotates in the same direction. The tension upon spring 344 is not changed. When the pin 352 is rotated clockwise it comes out of engagement with the pin 362, carried by the spring housing 356, and the tension of spring 360 causes the housing 356 to be rotated clockwise, slowly, following the housing 340, until the housing 356 has been rotated through the same angle as housing 340, at which point pin 362 again engages pin 352 and the rotation of housing 356 is stopped. The rotation of housing 356 slightly relaxes the tension upon spring 360.

The rotation of housing 356 causes a clockwise rotation of shaft 354, and as best seen in Fig. 3, the gear 366 is rotated in the same direction. By means of eccentric 368 and coupling 370, the rotor 138 of transmitter 115 is rotated clockwise, and the operation of the Selsyn type transmitter results in a movement of needle 134 seen in Fig. 2 over dial 130, to modify the reading of the magnetic compass instrument basically dependent upon the actual fuselage heading.

When the bellows 246 and 238 in Fig. 3 are later neutralized, it will be appreciated without a detailed explanation that the rod 312 is returned to its neutral position as are all of the elements of the bellows centering assembly 319. Shaft 318 is returned to its neutral position, as are all of the elements of the spring coupling assembly 338, and shaft 354 is returned to its neutral position. Accordingly gear 366 and the rotor 114 of the transmitter are returned to their neutral positions, and the modified reading of the magnetic compass indicator 126 in Fig. 2 is removed from the instrument so that the instrument indicates in accordance with actual fuselage heading.

It is believed unnecessary to explain in detail that when bellows 238 is collapsed and bellows 246 is expanded the bellows centering assembly 319 operates to cause a counterclockwise rotation of shaft 318, which rotation is transferred to the shaft 354 by means of the spring coupling assembly 338, so that the rotor 138 of stator 114 is rotated counterclockwise, resulting in a modified compass indication, but in the opposite direction from that first explained above. When the bellows 238 and 246 are neutralized, the modified indication of the compass indicator is no longer present.

Still referring to Fig. 3, it will be appreciated that whenever gear 366 is rotated in response to a change in the position of the central bellows member 298, by means of pinion 374, gear 376, and pinion 378 the flywheel 382 and fins 384 will be rotated. The purpose of this flywheel will be described in detail hereinafter.

*Operation*

Considering now in detail the operation of the previously described apparatus, when the rudder pedals 36 and 44 are in their neutral positions, the rudder valve 56 is also neutralized and consequently the trainer fuselage 12 will not be turning. Accordingly, the gear 98 in Fig. 2 will be stationary, and the stator 114 in Fig. 3 will be stationary. Also the reversible valve 168 shown in Fig. 4 will be in its neutral position, and accordingly the pressure within the pneumatic lines 190 and 196 leading to the heading valve 192 will be equalized. Accordingly, regardless of what position the heading valve rotor 260 is in, which position is dependent on the actual heading of fuselage 12, the pressure within the pneumatic lines 234 and 242 leading to the bellows 238 and 246 will be atmospheric, these two bellows will be in their central positions, and the assemblies 319 and 338 will be neutralized, thereby neutralizing the rotor 138 of stator 114. Accordingly the indication given by the magnetic compass indicator 126 in Fig. 2 will remain constant and will indicate the actual fuselage heading. There will be no northerly turning error introduced therein.

Assuming that the fuselage 12 is on an actual west heading and that the rudder pedals 36 and 44 are centered, the rudder valve 56 will be centered and the fuselage 12 will not be turning. The reversible valve 168 of Fig. 4 will be centered and the pressure within pneumatic lines 190 and 196 will be neutralized. The heading valve rotor 260 will be displaced 180 degrees from the position shown in Fig. 6. Accordingly, the magnetic compass indicator 126 will indicate a due west heading. Assuming that the left rudder pedal is pressed forward to rotate the fuselage 12 from west to south to east to north to west, etc., the upper leaf 54 of the rudder valve will be rotated to energize the turning motor 32 to turn the fuselage 12 in that direction. At the same time, link 140 of Fig. 2 will move ahead, and the rotor 166 of the reversible valve 168 in Fig. 5 will be displaced counterclockwise of its neutral position. Vacuum will be admitted to line 190 and atmosphere into line 196. The magnitude of these admissions will depend upon the rate of turn of fuselage 12 which in turn depends upon the magnitude of the displacement of the rudder pedals from their neutral positions.

As the trainer rotates, rotor 260 of the heading valve rotates clockwise from its neutral position, as viewed in Fig. 3, and the clockwise rotation of rotor 260 connects pneumatic line 190 with line 234 through groove 262, channel 272, groove 266 and coupling 232. Inasmuch as line 234 runs to bellows 238, this bellows will be contracted. At the same time, the rotation of the heading valve connects line 196 with line 242 through groove 264, channel 274 and groove 268. Inasmuch as line 242 connects with bellows 246, this bellows will be expanded. It will be appreciated that this bellows action occurs soon after the fuselage 12 leaves the west heading. The expansion of bellows 246 and collapsing of bellows 238 rotates shaft 354 counterclockwise, as viewed from the right in Fig. 3, through the spring couplings 319 and 338, and the rotor 138 of the transmitter 115 is also rotated counterclockwise. Inasmuch as the housing 114 of the Selsyn transmitter 115 is being rotated clockwise in response to the rotation of fuselage 12, it will be appreciated that the angular displacement between the rotor 138 and housing 114 is actually greater at any instant than the angular departure of fuselage 12 from the west heading. Accordingly, the needle 134 of the magnetic compass indicator 126 in Fig. 2 is moved counterclockwise over dial 130 from the due west position by an amount greater than the actual rotation of fuselage 12 from the due west heading. In this manner, the indication of the magnetic compass indicator 126 leads the actual rotation of fuselage 12, just as would be the case of a magnetic compass in a plane in actual flight flying under corresponding actual circumstances.

It will be appreciated that this lead builds up to a maximum when the actual fuselage heading is south, at which time the rotor 260 is positioned with the coupling 399 in the 3 o'clock position, as viewed in Fig. 6. At this time the ports 232 and 240 will be exactly opposite the widest part of the grooves 268 and 266. Accordingly, the bellows 238 and 246 will be deflected the farthest from their neutral positions, so the maximum lead indication is present.

After passing through the south heading, the rotor 260 of the heading valve continues to rotate clockwise as seen in Fig. 6, and the tapered characteristics of the grooves 266 and 268 cut down the atmosphere applied to line 242 and the vacuum applied to line 234. The bellows 238 and 246 slowly are neutralized, and shortly before the fuselage 12 reaches an actual east heading until slightly after the actual east heading is passed, the heading valve is closed, the bellows 238 and 246 are neutralized through vents 250 and 254, the position of rotor 138 is neutralized, and so there is no substantial discrepancy between the indication of the magnetic compass indicator 126 and the actual fuselage heading. When the heading of the fuselage 12 has passed beyond the east heading by a substantial amount the continuing clockwise rotation of the rotor 260 of the heading valve brings groove 268 into engagement with port 232, and thereby aplying atmosphere from line 196 to the pneumatic line 234 which connects with bellows 238. Accordingly, this bellows is expanded. At the same time, the tapered port 266 engages port 240 and applies vacuum from line 190 to line 242 which connects with bellows 246, resulting in a contraction of this bellows. The expansion of bellows 238 and collapsing of bellows 246 results in a clockwise movement of the rod 312, as seen from the right in Fig. 3, and through the couplings 319 and 338 this motion is transferred to shaft 354 and rotor 138 of transmitter 115. Inasmuch as the housing 114 of transmitter 115 is still being rotated clockwise as a result of the rotation of fuselage 12, the rotor and housing movements are subtractive, and the magnetic compass indication lags the actual trainer heading.

The greatest collapsing of bellows 246 and expansion of bellows 238 occurs as the actual heading is due north, at which time the widest part of the tapered grooves 266 and 268 are directly opposite ports 240 and 232. At that time, the lag will be maximum.

Then, as the actual fuselage heading approaches west, the lag will diminish, and at the west heading there will be no lag because the areas 270 between the tapered grooves 266 and 268 will cover ports 232 and 240. The vents 250 and 254 will center the bellows 238 and 246.

It will therefore be appreciated that as the trainer is rotated from west to south to east to north to west, etc., when actual fuselage heading is south of west and east, the compass indication properly leads the actual heading, and when the heading is north of east and west, the indicated compass reading lags the actual heading. The lead and lag gradually build up and diminish, just as in the case of a plane in actual flight, and the magnitude of the lead and lag depend upon the rate of fuselage rotation, just as in the case of a plane in actual flight.

Considering now the operation of the apparatus of this invention when the trainer is rotating from west to north to east to south to west, etc., it will be appreciated that the reversal of the reversible valve 168 shown in Fig. 4 as a result of the forward displacement of the right rudder pedal will reverse the vacuum and atmosphere in pneumatic lines 190 and 196, i. e., the line 190 will be at atmospheric pressure and the line 196 will be supplied with vacuum. Inasmuch as the rotor 260 of the heading valve is always positioned in exactly the same manner for any given actual fuselage heading regardless of the direction of turning of the fuselage, it will be appreciated that the bellows 238 and 246 will be positioned for any given fuselage heading exactly opposite their positions as described in detail immediately above. Accordingly, from west to east through north bellows 238 will be contracted and bellows 246 will be expanded, displacing the rotor 138 counterclockwise of its neutral position. Inasmuch as during this interval the housing 114 of transmitter 115 is also being rotated counterclockwise, the relative motion between the housing and rotor is decreased, and the compass indication lags the actual heading.

From east to west through south the bellows 238 will be expanded and bellows 246 will be contracted, displacing rotor 138 clockwise of its neutral position. The movements of housing 114 and of rotor 138, being in opposite directions, are additive, and so the indication given by the magnetic compass indicator 126 leads the actual fuselage heading.

All of the above assumes that the plane is flying in the Northern Hemisphere. To simulate Southern Hemisphere conditions it is merely necessary to reverse the pneumatic lines 190 and 196. To simulate different distances from the equator, it is merely necessary to vary the effective length of arm 148 in Fig. 4.

It is believed unnecessary to explain in detail that the above outlined functionings properly occur when a turning of the fuselage 12 in either direction is started from any heading.

It has been previously stated that in the case of an aircraft in actual flight, when the plane is turning upon a heading where the magnetic compass indication leads or lags the actual plane heading, and the plane is taken out of the turn upon such a heading, the magnetic compass indication will oscillate several times in diminishing cycles about the actual heading, and finally come to rest at the actual heading, disregarding the factors of variation and deviation.

It is to simulate this phase of magnetic compass operation that the flywheel 382 and the associated gears of Fig. 3 are employed. It will be appreciated that if the central bellows member 298 is displaced from its neutral position, as is the case when a lead or lag indication is being given, and the rotation of fuselage 12 is terminated, the neutralization of the reversible valve 168 of Fig. 4 will result in a neutralization of the bellows 238 and 246. The central bellows member 298 will be neutralized, resulting in a return of the shaft 354 and gear 366 to its neutral position, under the influence of the assemblies 319 and 338 which also return to their neutral positions. The gear 366 rotates relatively slowly back to its neutral position, but at a slightly accelerated rate, and it will be appreciated that the reduction gear train interposed between this gear and the pinion 378 will cause the flywheel 382 to rotate much faster at an increasingly rapid rate. Accordingly, when the gear 366 has been returned to its neutral position, the inertia of flywheel 382 will carry this gear beyond its neutral position a substantial distance, but not quite as far as it was originally displaced on the other side. This displacement is made possible because of the provision of the spring coupling assembly 338. The displacement of gear 366 past its center position results in a tightening of the spring 360 or 344 of assembly 338 and in a relaxation of the other spring, depending upon the direction of rotation of the flywheel 382. The tightening of one of the springs will eventually stop the rotation of flywheel 382, and then the two springs 360 and 344 being out of balance, the shaft 354 will be rotated in the opposite direction, again past its neutral position but not as far as the first oscillation past neutral. This oscillation of the flywheel 382 and of the gear 366 and interconnecting gears will pass through two or three complete cycles of diminishing magnitude until the flywheel 382 and shaft 354 come to rest, with the springs of assembly 338 in balance at the center stop.

It will be appreciated that the rotor 138 of Selsyn transmitter 115 follows the oscillations of the shaft 354 and flywheel 382, and consequently, the needle 134 of the magnetic compass indicator 126 will oscillate about the actual heading and finally come to rest at an indication corresponding to the actual fuselage heading.

The vanes 384 attached to the flywheel 382 are used to dampen the oscillations of the flywheel.

It will be appreciated therefore that the apparatus of this invention provides improved means for use in grounded aviation trainers for simulating the operation of a magnetic compass indicator in a plane in actual flight. With the use of the disclosed apparatus, the student receiving instruction in the trainer will learn to take into account the northerly turning errors in a real compass.

Inasmuch as the preferred embodiment of this invention has been disclosed, it will be appreciated by those skilled in the art that many changes may be made in the construction thereof without departing from the substance of this invention nor from the scope of the following claims:

I claim:

1. In a grounded aviation trainer of the type comprising a pair of pedals simulating the rudder pedals of a real plane and an instrument simulating the magnetic compass of a real plane, the combination of a first means responsive to the successive directions, magnitudes and temporal durations of displacements of said pedals from their neutral positions for changing the indication of said instrument, and a second means for modifying the indication of said compass as determined by said first means, said second means including a reversible valve connected to said pedals and directionally controlled by the direction of displacement of said pedals, a rotary heading valve connected to said reversible valve, means interconnecting said rotary heading valve and said pedals for positioning said heading valve in accordance with the successive directions, magnitudes and temporal durations of displacements of said pedals from their neutral positions, and a connection between said rotary heading valve and said instrument whereby the instant modification of said compass reading is dependent upon the instant positions of said reversible and rotary heading valves.

2. In a grounded aviation trainer of the type comprising a pair of pedals simulating the rudder pedals of a real plane and an instrument simulating the magnetic compass of a real plane, the combination of a Selsyn transmitting system including a transmitter and a receiver for actuating said instrument, a first means responsive to the successive directions, magnitudes and temporal durations of displacements of said pedals from their neutral positions connected to said transmitter for changing the indication of said instrument, and a second means for modifying the indication of said compass as determined by said first means, said second means including a reversible valve connected to said pedals and directionally controlled by the direction of displacement of said pedals, a rotary heading valve connected to said reversible valve, means interconnecting said rotary heading valve and said pedals for positioning said heading valve in accordance with the successive directions, magnitudes and temporal durations of displacements of said pedals from their neutral positions, and a connection between said rotary heading valve and said transmitter, whereby the instant modification of said compass reading is dependent upon the instant positions of said reversible and rotary heading valves.

3. In a grounded aviation trainer of the type including a fuselage rotatably mounted upon a stationary base, a pair of pedals in the fuselage simulating the rudder pedals of a real plane for controlling the rotation of the fuselage, and an instrument in the fuselage simulating the magnetic compass of a real plane, the combination of a first means operable in response to the rotation of said fuselage relative to said stationary base for changing the indication of said instrument, and a second means for modifying the indication of said compass as determined by said first means, said second means including a reversible valve connected to said pedals and directionally controlled by the direction of displacement of said pedals, a rotary heading valve operable in response to the rotation of said fuselage relative to said stationary base to be positioned in accordance with the instant orientation of said fuselage relative to said stationary base, a connection between said reversible valve and said heading valve, and a connection between said heading valve and said instrument, whereby the instant modification of said compass reading is dependent upon the instant positions of said reversible and rotary heading valves.

4. In a grounded aviation trainer of the type including a fuselage rotatably mounted upon a stationary base, a pair of pedals in the fuselage simulating the rudder pedals of a real plane for controlling the rotation of the fuselage, and an instrument in the fuselage simulating the magnetic compass of a real plane, the combination of a Selsyn transmitting system including a transmitter and a receiver for actuating said instrument, a first means operable in response to the rotation of said fuselage relative to said stationary base connected to said transmitter for changing the indication of said instrument, and a second means for modifying the indication of said compass as determined by said first means, said second means including a reversible valve connected to said pedals and directionally controlled by the direction of displacement of said pedals, a rotary heading valve operable in response to the rotation of said fuselage relative to said stationary base to be positioned in accordance with the instant orientation of said fuselage relative to said stationary base, a connection between said reversible valve and said rotary heading valve, and a connection between said rotary heading valve and said transmitter, whereby the instant modification of said compass reading is dependent upon the instant positions of said reversible and rotary valves.

5. In a grounded aviation trainer of the type comprising a pair of pedals simulating the rudder pedals of a real plane and an instrument simulating the magnetic compass of a real plane, the combination of a first means responsive to the successive directions, magnitudes and temporal durations of displacements of said pedals from their neutral positions for changing the indication of said instrument, and a second means for modifying the indication of said compass as determined by said first means, said second means including a reversible valve connected to said pedals and directionally controlled by the direction of displacement of said pedals, a vacuum source and an atmospheric vent connected to said reversible valve, a rotary heading valve, a pair of pneumatic lines connecting said reversible valve and said rotary heading valve, means for positioning said rotary heading valve in accordance with the successive directions, magnitudes and temporal durations of displacements of said pedals from their neutral positions, a pneumatically operable member, a pair of pneumatic lines interconnecting said rotary heading valve and said pneumatically operable member, and a connection between said pneumatically operable member and said instrument, whereby the instant modification of said instrument reading is dependent upon the instant positions of said reversible and rotary heading valves.

6. In a grounded aviation trainer of the type comprising a pair of pedals simulating the rudder pedals of a real plane and an instrument simulating the magnetic compass of a real plane, the combination of a Selsyn transmitting system including a transmitter and a receiver for actuating said instrument, a first means responsive to the successive directions, magnitudes and temporal durations of displacements of said pedals from their neutral positions connected to said transmitter for changing the indication of said instrument, and a second means for modifying the indication of said compass as determined by said first means, said second means including a reversible valve connected to said pedals and directionally controlled by the direction of displacement of said pedals, a vacuum source and an atmospheric vent connected to said reversible valve, a rotary heading valve, a pair of pneumatic lines connecting said reversible valve and said rotary heading valve, means for positioning said rotary heading valve in accordance with the successive directions, magnitudes and temporal durations of displacements of said pedals from their neutral positions, a pneumatically operable member, a pair of pneumatic lines interconnecting said rotary heading valve and said pneumatically operable member, and a connection between said pneumatically operable member and said transmitter, whereby the instant modification of said instrument reading is dependent upon the instant positions of said reversible and rotary heading valves.

7. In a grounded aviation trainer of the type including a fuselage rotatably mounted upon a stationary base, a pair of pedals in the fuselage simulating the rudder pedals of a real plane for controlling the rotation of the fuselage, and an instrument in the fuselage simulating the magnetic compass of a real plane, the combination of a first means operable in response to the rotation of said fuselage relative to said stationary base for changing the indication of said instrument, and a second means for modifying the indication of said compass as determined by said first means, said second means including a reversible valve connected to said pedals and directionally controlled by the direction of displacement of said pedals, a vacuum source and an atmospheric vent connected to said reversible valve, a rotary heading valve, a pair of pneumatic lines connecting said reversible valve and said rotary heading valve, means for positioning said rotary heading valve in accordance with the instant orientation of said fuselage relative to said stationary base, a pneumatically operable member, a pair of pneumatic lines interconnecting said rotary heading valve and said pneumatically operable member, and a connection between said pneumatically operable member and said instrument, whereby the instant modification of said instrument reading is dependent upon the instant positions of said reversible and rotary heading valves.

8. In a grounded aviation trainer of the type including a fuselage rotatably mounted upon a stationary base, a pair of pedals in the fuselage simulating the rudder pedals of a real plane for controlling the rotation of the fuselage, and an instrument in the fuselage simulating the magnetic compass of a real plane, the combination of a Selsyn transmitting system including a transmitter and a receiver for actuating said instrument, a first means operable in response to the rotation of said fuselage relative to said stationary base connected to said transmitter for changing the indication of said instrument, and a second means for modifying the indication of said compass as determined by said first means, said second means including a reversible valve connected to said pedals and directionally controlled by the direction of displacement of said pedals, a vacuum source and an atomspheric vent connected to said reversible valve, a rotary heading valve, a pair of pneumatic lines connecting said reversible valve and said rotary heading valve, means for positioning said rotary heading valve in accordance with the instant orientation of said fuselage relative to said stationary base, a pneumatically operable member, a pair of pneumatic lines interconnecting said rotary heading valve and said pneumatically operable member, and a connection between said pneumatically operable member and said transmitter, whereby the instant modification of the reading of said instrument is dependent upon the instant positions of said reversible and rotary heading valves.

9. In a grounded aviation trainer of the type including a fuselage rotatably mounted upon a stationary base, rudder pedal means in the fuselage under the control of a student for rotating the fuselage, and an instrument in the fuselage simulating the magnetic compass of a real plane, the combination of means interconnecting the stationary base and said instrument for causing the instrument to register in accordance with the orientation of said fuselage relative to said base, a movable member, means interconnecting said rudder pedal means and said movable member and means interconnecting said stationary base and said movable member for displacing said movable member from its neutral position in a direction dependent upon the combined direction of rotation of said fuselage and instant orientation of said fuselage relative to said stationary base, a connection between said movable member and said instrument for modifying the reading of said instrument in accordance with the position of said movable member, and means for oscillating the connection between said movable member and said instrument upon a return of said movable member to its neutral position when said fuselage is oriented relative to said base in certain predetermined positions.

10. In a grounded aviation trainer of the type including a fuselage rotatably mounted upon a stationary base, means in the fuselage under the control of a student for rotating the fuselage, and an instrument in the fuselage simulating the magnetic compass of a real plane, the combination of means interconnecting the stationary base and said instrument for causing the instrument to register in accordance with the orientation of said fuselage relative to said base, a pneumatically operated member, means for displacing said pneumatically operated member from its neutral position in accordance with the instant orientation of said fuselage relative to said stationary base, a first shaft, a universal spring assembly interposed between said shaft and said pneumatically operated member for centering the said member as well as rotating the shaft, a second shaft, a second universal spring assembly interconnecting said two shafts, a connection between said second shaft and said instrument, and means for oscillating said second shaft upon a return of said pneumatically operated member to its neutral position when said fuselage is oriented relative to said base in certain predetermined positions.

KARL A. KAIL.

REFERENCES CITED

The following references are of record in the file of this patent:

UNITED STATES PATENTS

| Number | Name | Date |
| --- | --- | --- |
| 2,099,857 | Link | Nov. 23, 1937 |
| 2,164,412 | Koster | July 4, 1939 |
| 2,308,566 | Noxon | Jan. 19, 1943 |
| 2,366,603 | Dehmel | Jan. 2, 1945 |
| 2,443,076 | Lowkrantz | June 8, 1948 |
| 2,460,305 | Muller | Feb. 1, 1949 |

FOREIGN PATENTS

| Number | Country | Date |
| --- | --- | --- |
| 396,537 | Great Britain | 1933 |
| 396,538 | Great Britain | 1933 |